United States Patent
Bi et al.

(10) Patent No.: US 7,227,837 B1
(45) Date of Patent: Jun. 5, 2007

(54) FAULT TOLERANT VIRTUAL TANDEM SWITCH

(75) Inventors: Haifeng Bi, Austin, TX (US); George Coleman Allen, Jr., Pflugerville, TX (US); Randy Beamon, Cedar Park, TX (US); Weijing Chen, Austin, TX (US); Janice Elaine Doerner, Dripping Springs, TX (US); Mehran Esfandiari, El Cerrito, CA (US); Gary Jonathan Gibbons, San Antonio, TX (US); Paul August Kaschube, Austin, TX (US); Bruce Allen Nance, San Antonio, TX (US); John Pinch, Richardson, TX (US); Tina Sigarto, Raleigh, NC (US); Barbara Engel Smith, San Antonio, TX (US); Matthew Wayne Stafford, Austin, TX (US); George Anthony Young, Austin, TX (US)

(73) Assignee: AT&T Labs, Inc., Austin, TX (US)

( * ) Notice: Subject to any disclaimer, the term of this patent is extended or adjusted under 35 U.S.C. 154(b) by 0 days.

(21) Appl. No.: 09/534,308

(22) Filed: Mar. 23, 2000

Related U.S. Application Data

(63) Continuation-in-part of application No. 09/287,092, filed on Apr. 7, 1999, now Pat. No. 6,169,735.

(60) Provisional application No. 60/083,640, filed on Apr. 30, 1998.

(51) Int. Cl.
*G01R 31/08* (2006.01)
*G08C 15/00* (2006.01)
*H04L 1/00* (2006.01)
*H04L 12/66* (2006.01)

(52) U.S. Cl. .................................... 370/217; 370/356

(58) Field of Classification Search ........ 370/216–218, 370/352, 356, 355.5
See application file for complete search history.

(56) References Cited

U.S. PATENT DOCUMENTS 5,260,978 A 11/1993 Fleischer et al.
(Continued)

FOREIGN PATENT DOCUMENTS

CA 2299438 9/2003
(Continued)

OTHER PUBLICATIONS

Mailik, O., "It's the Voice, Stupid", Forbes, Digital Tool, Sep. 8, 1999.
(Continued)

*Primary Examiner*—Kevin C. Harper
(74) *Attorney, Agent, or Firm*—Greenblum & Bernstein, P.L.C.

(57) ABSTRACT

A system and method for reducing and surviving failures in a voice trunking over ATM (VTOA) environment includes an ATM network having a plurality of interconnected ATM switches. The VTOA system also includes a CS-IWF complex having a plurality of interconnected CS-IWF units, each unit having a plurality of processors. An end office building may also be provided for interaction with the VTOA system. The end office building includes multiple T-IWFs, and a switch that distributes calls among the T-IWFs in a load sharing manner. Each T-IWF has a plurality of processors and is part of the VTOA system. A switch management system is also provided in the VTOA system. In order to reduce and survive failures, the switch management system includes a plurality of switch management system units. At least one of the switch management system units is a backup unit for at least one primary switch management system unit. Each switch management system unit provides application redundancy within itself.

14 Claims, 5 Drawing Sheets

U.S. PATENT DOCUMENTS

| | | | |
|---|---|---|---|
| 5,363,369 A | 11/1994 | Hemmady et al. | |
| 5,392,402 A | 2/1995 | Robrock, II | |
| 5,428,607 A | 6/1995 | Hiller et al. | |
| 5,434,853 A | 7/1995 | Hemmady et al. | |
| 5,434,854 A | 7/1995 | Focarile et al. | |
| 5,438,565 A | 8/1995 | Hemmady et al. | |
| 5,459,722 A | 10/1995 | Sherif | |
| 5,483,527 A | 1/1996 | Doshi et al. | |
| 5,513,174 A | 4/1996 | Punj | |
| 5,539,884 A | 7/1996 | Robrock, II | |
| 5,568,475 A | 10/1996 | Doshi et al. | |
| 5,581,551 A | 12/1996 | Fundneider et al. | |
| 5,619,500 A | 4/1997 | Hiekali | |
| 5,623,491 A | 4/1997 | Skoog | |
| 5,638,365 A | 6/1997 | Duault et al. | |
| 5,680,437 A * | 10/1997 | Segal | 379/15.01 |
| 5,684,800 A | 11/1997 | Dobbins et al. | |
| 5,703,876 A | 12/1997 | Christie | |
| 5,710,769 A | 1/1998 | Anderson et al. | |
| 5,719,863 A | 2/1998 | Hummel | |
| 5,757,783 A | 5/1998 | Eng et al. | |
| 5,781,320 A | 7/1998 | Byers | |
| 5,796,836 A | 8/1998 | Markham | |
| 5,825,750 A | 10/1998 | Thompson | |
| 5,867,571 A * | 2/1999 | Borchering | 379/230 |
| 5,883,893 A | 3/1999 | Rumer et al. | |
| 5,889,773 A | 3/1999 | Stevenson, III | |
| 5,898,673 A | 4/1999 | Riggan et al. | |
| 5,914,956 A | 6/1999 | Williams | |
| 5,930,238 A | 7/1999 | Nguyen | |
| 5,943,321 A | 8/1999 | St-Hilaire et al. | |
| 5,953,316 A | 9/1999 | Lazar et al. | |
| 5,956,334 A | 9/1999 | Chu et al. | |
| 5,991,301 A | 11/1999 | Christie | |
| 5,991,746 A | 11/1999 | Wang | |
| 6,009,100 A | 12/1999 | Gausmann et al. | |
| 6,028,933 A | 2/2000 | Heer et al. | |
| 6,031,840 A | 2/2000 | Christie et al. | |
| 6,035,405 A | 3/2000 | Gage et al. | |
| 6,049,531 A | 4/2000 | Roy | |
| 6,101,183 A | 8/2000 | Byers | |
| 6,118,759 A * | 9/2000 | Ohyoshi et al. | 370/229 |
| 6,134,235 A | 10/2000 | Goldman et al. | |
| 6,141,339 A | 10/2000 | Kaplan et al. | |
| 6,151,315 A | 11/2000 | Ash et al. | |
| 6,169,735 B1 | 1/2001 | Allen, Jr. et al. | |
| 6,195,333 B1 | 2/2001 | Wise | |
| 6,195,714 B1 | 2/2001 | Li et al. | |
| 6,219,348 B1 | 4/2001 | Allen, Jr. et al. | |
| 6,252,952 B1 | 6/2001 | Kung et al. | |
| 6,275,493 B1 | 8/2001 | Morris et al. | |
| 6,282,194 B1 | 8/2001 | Cheesman et al. | |
| 6,343,065 B1 | 1/2002 | Serbest et al. | |
| 6,345,048 B1 | 2/2002 | Allen, Jr. et al. | |
| 6,389,011 B2 | 5/2002 | Allen, Jr. et al. | |
| 6,470,018 B1 * | 10/2002 | Wiley et al. | 370/396 |
| 6,510,164 B1 * | 1/2003 | Ramaswamy et al. | 370/466 |
| 6,563,918 B1 * | 5/2003 | Nelson et al. | 379/230 |
| 6,643,282 B1 * | 11/2003 | Christie | 370/352 |
| 6,757,278 B1 | 6/2004 | Bi et al. | |
| 6,765,903 B1 | 7/2004 | Allen, Jr. et al. | |
| 6,782,004 B1 * | 8/2004 | Brusilovsky et al. | 370/467 |
| 6,870,827 B1 | 3/2005 | Voit et al. | |
| 2001/0036188 A1 | 11/2001 | Carlsson | |
| 2002/0009086 A1 | 1/2002 | Gallant et al. | |
| 2002/0061101 A1 | 5/2002 | Hall, Jr. et al. | |
| 2002/0064129 A1 | 5/2002 | Serbest et al. | |
| 2002/0071394 A1 * | 6/2002 | Kozly et al. | 370/248 |
| 2002/0075855 A1 * | 6/2002 | Bruno et al. | 370/352 |
| 2002/0093947 A1 | 7/2002 | Allen, Jr. et al. | |
| 2004/0022237 A1 | 2/2004 | Elliott et al. | |
| 2004/0179531 A1 | 9/2004 | Bi et al. | |

FOREIGN PATENT DOCUMENTS

| | | |
|---|---|---|
| CN | 139933 | 12/2001 |
| WO | 99/57851 | 11/1999 |

OTHER PUBLICATIONS

ATM Forum Technical Committee, "Circuit Emulation Service Interoperability Specification", Version 2.0, published Jan. 1997.

ATM Forum Technical Commitee, "Voice and Telephony over ATM-ATM Trunking Using AAL1 for Narrowband Services", Version 1.0, published Jul. 1997.

ITU-T Recommendation Q.2955.1, "Stage 3 Description for Community of Interest Supplementary Services Using B-ISDN DSS 2: Closed User Group (CUG)", Jun. 1997.

Lucent Technologies, "NavisCore ATM Configuration Guide", Chapter 15.

ATM Forum Technical Committee "Traffic Management Specification", Version 4.0, Document af-tm-0056-000, Apr. 1996.

ATM Forum Technical Commitee "ATM Security Specification," Version 1.0, Document af-sec-0100-001, Feb. 1999.

Iwata et al., "An ATM Subscriber Line Interface Circuit for Voice and Telephony over ATM (VTOA)," IEEE, vol. 1, pp. 270-274 (Nov. 13, 1995), XP010607567.

* cited by examiner

FAULT TOLERANT VIRTUAL TANDEM SWITCH

CROSS-REFERENCE TO RELATED APPLICATIONS

This application is a continuation-in-part of pending U.S. patent application Ser. No. 09/287,092, filed Apr. 7, 1999 now U.S. Pat. No. 6,169,735, to George C. ALLEN Jr. et al., entitled "ATM-based Distributed Virtual Tandem Switching System," which claims the benefit of U.S. Provisional Patent Application No. 60/083,640 filed on Apr. 30, 1998, entitled "ATM-Based Distributed Virtual Tandem Switching System" to ALLEN et al., the disclosures of which are expressly incorporated herein by reference in their entireties.

BACKGROUND OF THE INVENTION

1. Field of the Invention

The present invention relates to the field of telecommunications. More particularly, the present invention relates to reliably constructing and operating asynchronous transfer mode (ATM)-based telecommunications networks.

2. Background Information

Tandem replacement using voice trunking over ATM (VTOA) technology, described in U.S. patent application Ser. No. 09/287,092, to George C. ALLEN Jr. et al., entitled "ATM-based Distributed Virtual Tandem Switching System," filed on Apr. 7, 1999, is one application of an ATM distributed network system architecture. The architecture represents a new paradigm of networking that requires re-thinking of how to run networks. An important consideration is how to construct and operate the new ATM-based virtual tandem switch as reliably as possible and, definitely, no less reliably than current time division multiplexed (TDM) tandems.

The ATM-based virtual tandem system impacts system reliability. On one hand, the virtual tandem improves system reliability by distributing its components geographically, localizing the impact of failures. On the other hand, a greater number of network elements is involved, and thus the number of occurrences of element failures may increase. Because the virtual tandem is designed to serve an entire metropolitan area, it is imperative for the virtual tandem's design to meet the highest level of survivability.

The present invention identifies potential failure points in the virtual tandem and provides solutions to reduce and survive failures. The solutions, in turn, place design and engineering requirements upon equipment vendors and companies operating the virtual tandem. It is therefore a primary object of the present invention to employ these requirements for use in the design of the network elements and for engineering the networks.

With reference to FIG. 1 of the drawings, standard call processing employs end offices 10 connected via tandem trunks 12, direct trunks 14, or both tandem trunks 12 and direct trunks 14. Each trunk 12, 14 is a digital service level 0 (DS0), operating at 64 kbps, that is transmitted between the switching offices 10 in a time division multiplexed manner. Each end office 10 connects to its neighboring end office 10 and the tandem office 16 using separate trunk groups. In this system, trunk groups are forecasted and pre-provisioned with dedicated bandwidth, which may lead to inefficiency and high operations cost.

A new voice trunking system using ATM technology has been proposed in U.S. patent application Ser. No. 09/287,092, entitled "ATM-Based Distributed Virtual Tandem Switching System." In this system, shown in FIG. 2, voice trunks from end office switches 20, 26 are converted to ATM cells by a first or second trunk inter-working function (T-IWF) device 22, 24. The T-IWFs 22, 24 are distributed to each end office 20, 26, and are controlled by a centralized control and signaling inter-working function (CS-IWF) device 28. The CS-IWF 28 performs call control functions as well as conversion between the narrowband Signaling System No. 7 (SS7) protocol and a broadband signaling protocol. The T-IWFs 22, 24, CS-IWF 28, and the ATM network 30 form the ATM-based distributed virtual tandem switching system. According to this voice trunking over ATM (VTOA) architecture, trunks are no longer statistically provisioned as DS0 time slots. Instead, the trunks are realized through dynamically established switched virtual connections (SVCs), thus eliminating the need to provision separate trunk groups to different destinations, as done in TDM-based trunking networks.

BRIEF DESCRIPTION OF THE DRAWINGS

The present invention is further described in the detailed description that follows, by reference to the noted plurality of drawings by way of non-limiting examples of preferred embodiments of the present invention, in which like reference numerals represent similar parts throughout several views of the drawings, and in which.

DETAILED DESCRIPTION OF THE PREFERRED EMBODIMENTS

Figure 1:
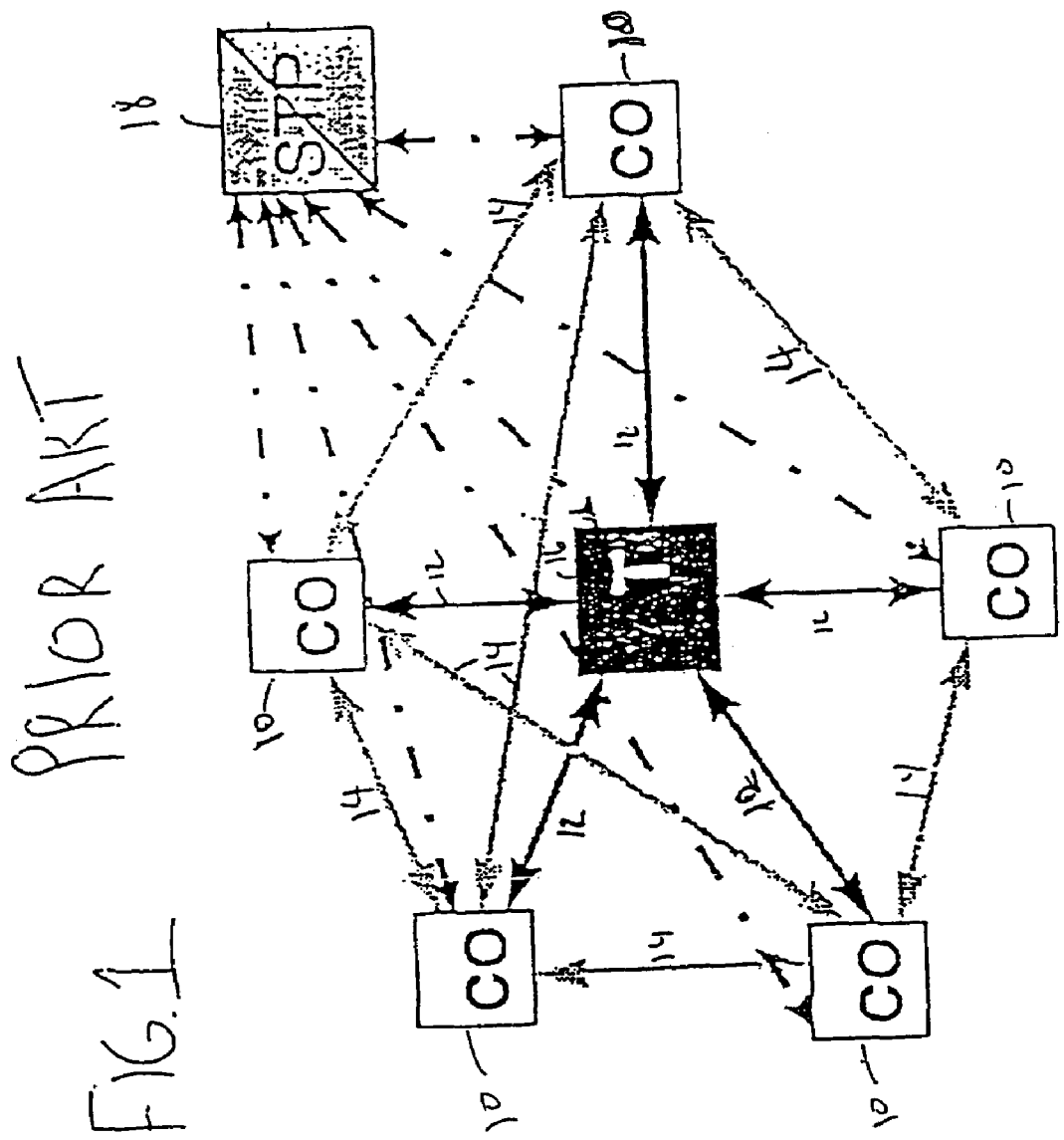
FIG. 1 shows a conventional TDM telecommunications network architecture.
Figure 2:
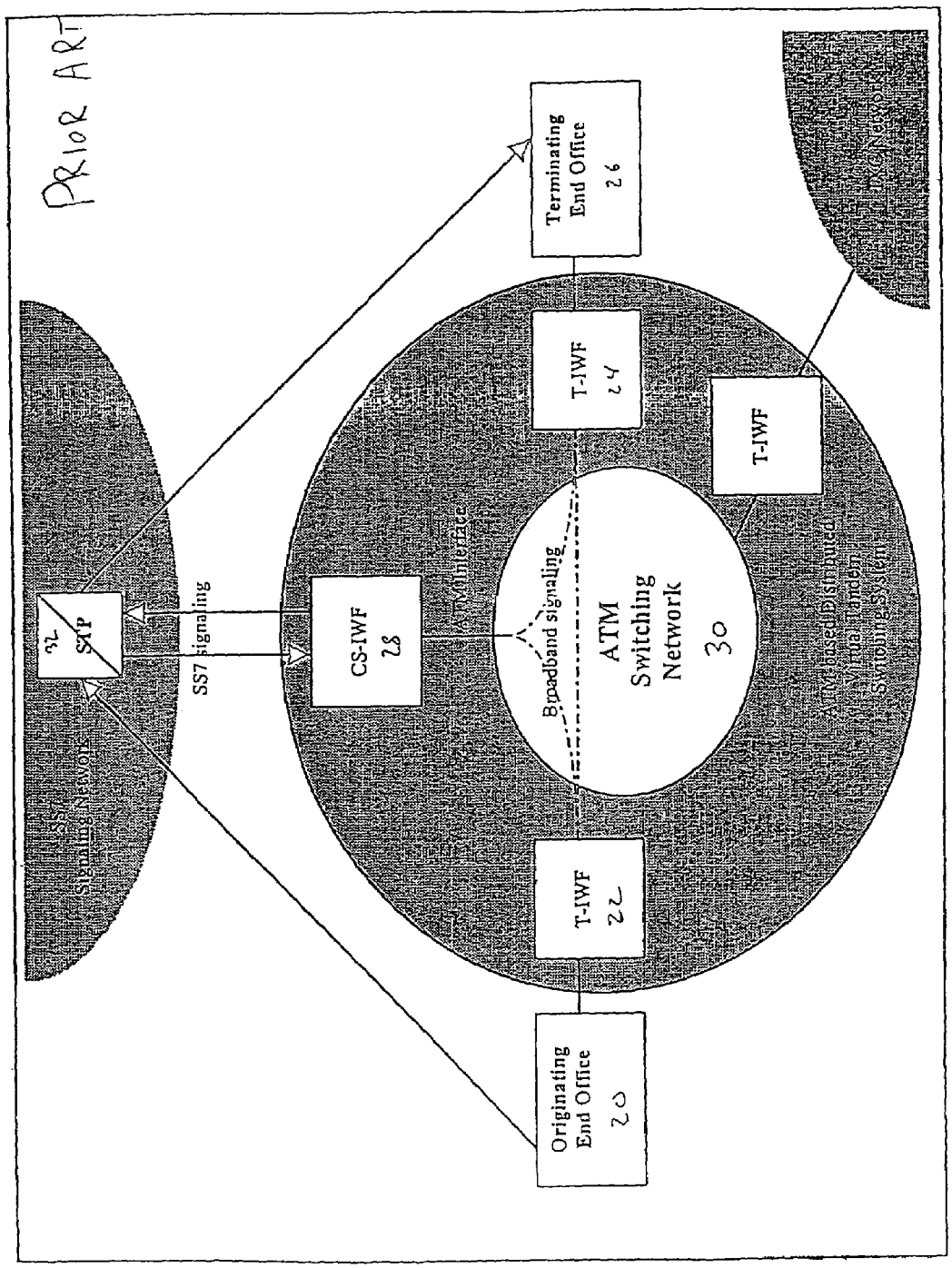
FIG. 2 shows a known virtual trunking over ATM telecommunications network architecture.

In view of the foregoing, the present invention is directed to improving the reliability of the VTOA system. The present invention identifies potential failure points of the VTOA system and provides various configurations to minimize the impact of failures.

According to an embodiment of the present invention, a control and signaling interworking function (CS-IWF) complex is provided for use within a VTOA system that communicates with mated signaling transfer points. The VTOA system includes an ATM network including multiple ATM switches and multiple trunk interworking functions (T-IWFs). The CS-IWF complex includes multiple CS-IWF units connected to at least two of the ATM switches and connected to at least one of the signaling transfer points. Each CS-IWF unit has multiple processors with at least one processor compensating for a failed processor. When a CS-IWF unit fails, at least one other CS-IWF unit compensates for the failed CS-IWF unit. The processor(s) compensating for the failed processor cooperate with the CS-IWF unites) compensating for the failed CS-IWF unit so that the CS-IWF complex survives simplex failures.

According to another embodiment, the CS-IWF complex includes multiple signaling link sets. Each link set connects the CS-IWF complex to one of the mated STPs. The CS-IWF complex may also include multiple signaling gateways that connect to each of the CS-IWF units. Each signaling gateway connects to one of the mated STPs. The multiple signaling gateways minimize isolation of the CS-IWF units when a link failure occurs. The CS-IWF complex also includes multiple ATM links that connect each CS-IWF unit to multiple ATM switches.

In one embodiment the multiple processors within each CS-IWF unit operate in an active/standby mode. Alternatively, the multiple processors operate in a load sharing mode.

Preferably, at least one of the CS-IWF units is located in a building separate from a building housing at least one other of the CS-IWF units. Furthermore, a single point code identifies the CS-IWF complex.

According to an embodiment of the present invention, an end office building is provided for use with a VTOA system. The VTOA system includes an ATM network including interconnected ATM switches, and at least one CS-IWF complex. The end office building includes multiple T-IWFs, which are part of the VTOA system. Each T-IWF has multiple processors with at least one processor compensating for a failed processor. Moreover, at least one T-IWF absorbs at least a portion of a failed T-IWF's workload. The end office building also includes a switch that distributes calls among the T-IWFs in a load sharing manner. Thus, the processor(s) compensating for the failed processor cooperate with the T-IWF(s) absorbing at least a portion of the failed T-IWF's workload so that the end office building survives simplex failures.

According to another embodiment, the end office building also includes at least one add/drop multiplexor (ADM) that connects the multiple T-IWFs to the ATM network. Preferably, each T-IWF also includes an optical interface for connecting to the ADM. The optical interface supports SONET 1+1 automatic protection switching.

In one embodiment, at least one T-IWF connects to a first ATM switch that is different from a second ATM switch to which another T-IWF connects. Thus, each end office building connects to multiple ATM switches so that if one ATM switch fails, the end office building remains connected to the ATM network.

According to another embodiment of the present invention, a method is provided for recovery from a failing ATM link in a VTOA system. The VTOA system includes an ATM network having multiple ATM switches interconnected by ATM links, multiple T-IWFs, and at least one CS-IWF complex. The method includes delaying recovery action in the ATM network for a predetermined duration while SONET recovery of the link is attempted. If the SONET recovery is successful a call path through the ATM network stays up. If the SONET recovery is unsuccessful, existing calls carried by the failed ATM link are dropped. Preferably, the predetermined duration is 100 milliseconds.

According to a further embodiment of the present invention, a switch management system (SMS) is provided for use within a VTOA system. The VTOA system includes an ATM network including a least one ATM switch, multiple T-IWFs, and at least one CS-IWF complex. The switch management system includes multiple switch management system units. At least one of the switch management system units is a backup unit for at least one primary switch management system unit. Each switch management system unit provides application redundancy within itself. Consequently, the switch management system survives simplex failures.

Preferably, the primary switch management system unit is located in a building separate from a building housing the backup switch management system unit. In addition, each switch management system unit is connected to multiple ATM switches.

According to yet another embodiment of the present invention, a method is provided for restoring functions of a failed switch management system operating within a VTOA system. The VTOA system includes an ATM network including multiple ATM switches, multiple T-IWFs, and at least one CS-IWF complex. The method includes restoring essential surveillance of the VTOA system; restoring billing functions of the VTOA system; restoring full surveillance capability of the VTOA system; restoring configuration management of the VTOA system; and restoring performance management of the VTOA system.

According to yet another embodiment of the present invention, a VTOA system includes an ATM network having multiple interconnected ATM switches. Also provided are multiple mated signaling transfer points that communicate with the VTOA system. The VTOA system also includes at least one CS-IWF complex including multiple CS-IWF units connected to at least two of the ATM switches and connected to at least one of the signaling transfer points. Each unit has multiple processors that share load resulting from failure of one of the processors. In addition, at least one end office building is provided for interaction with the VTOA system. Each end office building includes multiple T-IWFs, each having multiple processors. A switch is also provided in the end office building(s) to distribute calls among the multiple T-IWFs in a load sharing manner. The VTOA system also includes a switch management system including multiple switch management system units. At least one of the switch management system units is a backup unit for at least one primary switch management system unit. Each switch management system unit provides application redundancy within itself. Consequently, the VTOA system survives simplex failures. According to another embodiment, there are at least two completely disjointed routes between any two end points.

According to yet another embodiment of the present invention, a method is provided for communicating over a VTOA system. The VTOA system includes a CS-IWF complex, an ATM network containing multiple ATM switches, and a signaling network. Multiple end office buildings are provided for interaction with the VTOA system. Each end office building includes a switch and multiple T-IWFs, which are part of the VTOA system. The method includes transmitting a signal from the switch to the T-IWFs in a load sharing manner; and transmitting from the T-IWFs to the ATM switches in a load sharing manner. Thus, communications survive a simplex failure in the VTOA system.

According to the present invention, the following failure points are analyzed: CS-IWF failure; T-IWF failure; ATM network failure; and SMS failure. Each of these failure scenarios is discussed below along with survivability measures to protect against and survive these failures. Each solution, discussed below, guarantees that the network will survive all simplex failures. A simplex failure is the occurrence of a single network element failure, in contrast to simultaneous failures of multiple network elements. To survive means that, in the event of a simplex failure, the network must be able to continue to operate and recover on its own either to its normal or to a compromised level of performance.

CS-IWF

The CS-IWF is the most critical element of the new virtual tandem because failure of the CS-IWF impacts the entire serving area. Thus, failure of the CS-IWF is not acceptable, and therefore the CS-IWF requires the highest level of reliability. Exemplary CS-IWF units include the Connection Gateway from Lucent Technologies Inc, and the Succession Call Server, from Nortel Networks Corporation.

Figure 3:
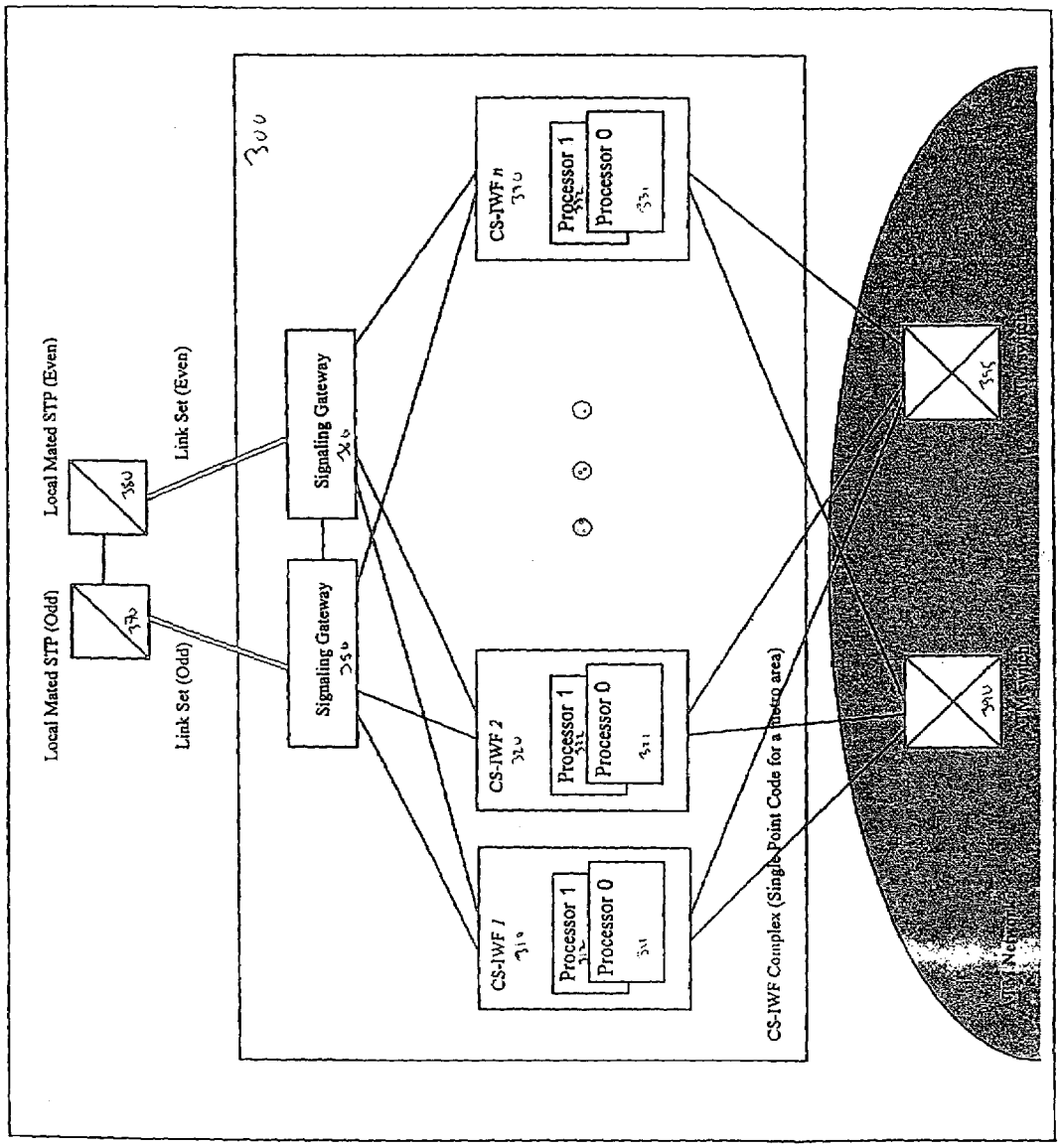
FIG. 3 shows a CS-IWF complex architecture, according to one aspect of the present invention.

FIG. 3 shows a design for a reliable CS-IWF complex 300 that includes multiple CS-IWF units 310, 320, 330. According to the present invention, each CS-IWF complex 300 serving a metropolitan area is assigned a single point code, regardless of how many individual CS-IWF units 310, 320, 330 the complex 300 contains. In FIG. 3, a general case is depicted where the CS-IWF complex 300 includes of n CS-IWFs 310, 320, 330 for reasons of reliability or processing capacity. A special case occurs when n=2, in which case two CS-IWFs 310, 320 operate in a load sharing or active/standby mode.

According to an object of the present invention, each CS-IWF unit 310, 320, 330 must be highly reliable. To achieve this objective, redundant processors are provided within each CS-IWF 310, 320, 330 for protection against processor failure. In FIG. 3, processor 0 311, 321, 331 and processor 1 312, 322, 332 are shown, although one of ordinary skill in the art will realize that more processors can be added without departing from the scope of the present invention. The redundant processors may operate in an active/standby mode or in a load sharing mode.

Each CS-IWF complex 300 must contain spare capacity for protection. The specific architecture of the CS-IWF complex 300 dictates the spare processing capacity required. For example, in a complex 300 where n=2, if one CS-IWF 310 fails, the remaining CS-IWF 320 must be able to handle the load of the CS-IWF 310 that failed. If three CS-IWFs 310, 320, 330 are provided, any two remaining CS-IWFs 320, 330 should be able to handle the load of the failed CS-IWF 310. Thus, a CS-IWF complex 300 must contain at least two CS-IWF units 310, 320. In general, in a CS-IWF complex 300 of n units, up to k (k≧1) out of the n CS-IWF units 310, 320, 330 must be provided for the purpose of protection. The objective is that the loss of one CS-IWF 310 unit has no impact on the call handling capacity of the CS-IWF complex 300 as a whole. In the active/standby mode, n−k CS-IWFs 310, 320 are active, and k operate in standby mode. In the load-sharing mode, all n CS-IWFs 310, 320, 330 run at levels less than maximum such that if one of the CS-IWFs 310 should fail, its processing load can be absorbed by the remaining CS-IWFs 320, 330.

In an embodiment, all components of a CS-IWF complex 300 are not provided at the same physical location. As a result, the loss of one physical location does not shut down the entire network. In this embodiment, the components can be connected via either dedicated or networked links. All components of the CS-IWF complex 300 are NEBS level 3 compliant. See GR-63-CORE, (*Network Equipment—Building System [NEBS] Requirements: Physical Protection*)—A module of LSSGR, FR-64; TSGR, FR-440; and NEBSFR, FR-2065; GR-1089-CORE, (*Electromagnetic Compatibility and Electrical Safety Generic Criteria for Network Telecommunications Equipment*)—A module of LSSGR, FR-64; and TSGR, FR-440; and SR-NWT-002550, (*Technical Considerations for NEBS*-2000), the disclosures of which are expressly incorporated by reference in their entireties, for more about NEBS level 3.

As is well known, STPs typically include mated pairs 370, 380 operating in a load-sharing manner to increase reliability. To take advantage of the mated STP's reliability and to further improve the CS-IWF complex's 300 reliability, a CS-IWF complex 300 maintains, at a minimum, two signaling link sets, one with each of the local mated STPs 370, 380. Moreover, within a CS-IWF complex 300, the CS-IWF units 310, 320, 330 are connected with the signaling link sets in a configuration that minimizes the possibility of any CS-IWF unit 310, 320, 330 being isolated from the signaling network as a result of a link or link-set failure. A non-limiting example of such interconnection using signaling gateways 350, 360 is shown in FIG. 3. The CS-IWF complex must support low-speed signaling links (e.g., 56 kbps to operate with SS7) with the ability to migrate to high-speed links (e.g., T1 or T1 ATM).

Each CS-IWF complex 300 bridges between narrowband and broadband signaling. For example, the narrowband signaling may be in the form of SS7 ISUP messages, and the broadband signaling may be standard-based broadband signaling, for example ATM UNI or PNNI.

The signaling gateways 350, 360 are part of the CS-IWF complex 300 and distribute SS7 signaling to each CS-IWF unit 310, 320, 330. The signaling gateways 350, 360 form an interconnection network that connects STPs 370, 380 to CS-IWF units 310, 320, 330. In other words, the signaling gateways are a distribution vehicle. An exemplary signaling gateway is the Connection Gateway Signaling Node, manufactured by Lucent Technologies, Inc.

In another embodiment, each CS-IWF 310, 320, 330 maintains an ATM link with two different ATM switches 390, 395 in the ATM network so that the CS-IWF complex 300 can communicate with T-IWFs, other CS-IWFs and the SMS (not shown in FIG. 3). Preferably the ATM switches 390, 395 are on separate SONET rings. Further, it is not necessary for all CS-IWFs 310, 320, 330 to connect to the same two ATM switches 390,395. According to this embodiment, the well known 1+1 automatic protection switching (APS) is not required.

T-IWF

It is an object of the present invention that each T-IWF is highly reliable, i.e., nearly always available. Therefore, according to one embodiment, the critical components (e.g., processor) within a T-IWF are redundant to achieve this object. Exemplary T-IWFs include the 7R/E Trunk Access Gateway, from Lucent Technologies Inc.; and the Succession Multi-service Gateway 4000 (MG 4000), from Nortel Networks Corporation.

Figure 4:
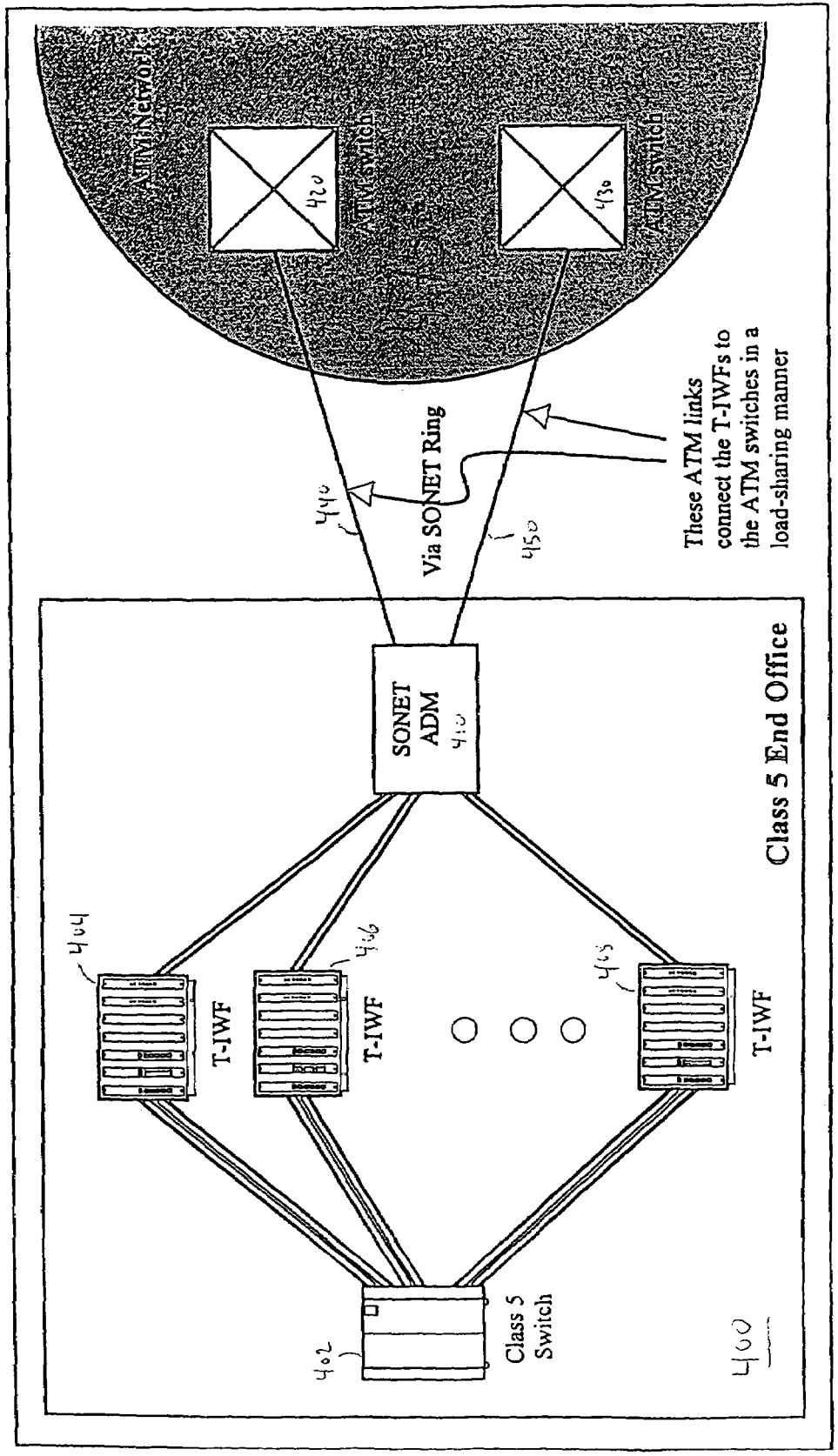
FIG. 4 shows an end office architecture and its relationship with an ATM network, according to another aspect of the present invention.

FIG. 4 illustrates an exemplary architecture of an end office building 400 and its relationship to an ATM network 475. In FIG. 4, a class 5 end office building (EO) 400 includes a switch 402, associated T-IWFs 404, 406, 408, which should be NEBS level 3 compliant, and a SONET add/drop multiplexer (ADM) 410. Exemplary switches include class 5 switches such as: the Lucent Technologies Inc. 1AESS; the Lucent Technologies Inc. 5ESS; the Ericsson AXE-10; and/or the Northern Telecom (Nortel) DMS-100 switches. In FIG. 4 a general case is shown where multiple T-IWF units 404, 406, 408, are deployed in an end office building 400 for reasons of reliability or capacity. Although the switch 402 and ATM switches 420, 430 shown in FIG. 4 are not co-located in the same end office building 400, such co-location may occur in other end office buildings.

According to the present invention, a class 5 switch having traffic volume requiring only one T-IWF is still connected with two T-IWFs for protection. Consequently, loss of one T-IWF does not isolate the class 5 switch. Furthermore, a class 5 switch must be able to maintain as few as one trunk group regardless of the number of T-IWFs by which it is served. According to an embodiment, the class 5 switch 402 distributes its calls among the T-IWFs 404, 406, 408 in a load-sharing manner. Thus, loss of one of the T-IWFs 404, 406, 408 may degrade the trunking capacity of the class 5 switch 402, but will not isolate the class 5 switch 402.

The optical interface on the T-IWF 404, 406, 408 for connecting with the SONET add/drop multiplexer (ADM) 410 (or an ATM switch 420, 430 when an ATM switch 420, 430 is located in the same end office building 400) supports the SONET 1+1 Automatic Protection Switching (APS) scheme, although deployment of this feature is optional. The ADM 410 connects the T-IWFs 404, 406, 408 to the ATM switches 420, 430 at the ATM layer via links 440, 450. The links 440, 450 are preferably SONET rings that connect the T-IWFs 404, 406, 408 to ATM switches 420, 430 in a load sharing manner. Exemplary ADMs are manufactured by Fujitsu, Lucent Technologies Inc., and Nortel.

Each T-IWF 404, 406, 408 serving a given end office building 400 does not connect to the ATM network at the same ATM switch 420, 430. Rather, each T-IWF 404, 406, 408 is single-homed to an ATM switch 420, 430, while each end office building 400 is multi-homed to multiple ATM switches 420, 430, preferably on separate SONET rings 440, 450. This configuration prevents the end office building 400 from becoming totally disconnected from the ATM network in the event of an ATM host 420, 430 failure, although the T-IWFs 404, 406, 408 connected to the failed ATM switch 420, 430 may be impacted. Preferably, the SONET transport network 440, 450 employs unidirectional path switched ring (UPSR) or bi-directional line switched ring (BLSR). In order to protect against both ATM and SONET layer failures, the ATM layer virtual path protection capability in a SONET/ATM hybrid transport node may be supported. Further, the ATM VP ring functionality may be integrated into the T-IWF 404, 406, 408 and the ATM switches 420, 430. According to another embodiment, ATM virtual path (VP) ring functionality is either integrated with or separated from the T-IWF 404, 406, 408 to achieve the potential benefits of ATM layer VP protection and transport layer efficiency.

ATM Network

An example ATM network environment, as relevant to the analysis of the failure scenarios, is now discussed. However, if an ATM network having a different configuration is provided, alternate CS-IWF, T-IWF, SMS, etc. configurations from those presently described may be preferred. In the exemplary ATM network, ATM switches are not protected with redundant ATM switches; nor are ATM virtual connections carrying bearer channels protected with redundant virtual connections. The 1+1 protection of user network interface (UNI) interfaces on ATM switches is not universally deployed. In the absence of the ATM VP ring capability, no attempt (such as virtual connection re-routing) will be made at the ATM layer to save calls in progress that are impacted by an ATM equipment or link failure.

The 1+1 protection enables SONET recovery by directing traffic from a failed ring, e.g., a cut ring, to a properly functioning ring. That is, two devices are connected by two rings (one active ring and one standby ring) in the usual manner. When the active ring fails, the standby ring is activated.

In order to eliminate single points of total failure in the ATM network, the network must be constructed so that between any two end points at least two completely disjointed routes traverse the ATM network. Consequently, the ATM switches are able to intelligently route calls in this network, e.g., by balancing the call load between disjointed routes to reduce the impact of failure as well as to improve network performance. The balanced intelligent routing is performed in a known manner.

An ATM link failure occurs as result of a transport facility failure, such as a fiber cut. The ATM network therefore relies on known protection schemes in the transport network to recover from such a failure. In the event that the ATM switch detects a link failure, the ATM switch delays recovery action for a predetermined time period, preferably 100 ms, during which time the SONET layer recovery is attempted. If the transport layer successfully recovers, then the impact of the failure will only be a momentary degradation of the voice connections, and the connected call paths stay up. If the transport layer fails to recover from such a link failure, then existing calls being carried by the link are dropped. The ATM switches on both ends of the failed link will then flag the associated ports as unavailable, and future calls will automatically avoid the failed link until it is repaired. After the link is repaired, no manual intervention is required in order for traffic to resume using that link, as is well known.

According to the present invention, ATM switching equipment failures only include failures of non-redundant components, such as unprotected interface cards, or a whole switch. Exemplary ATM switches include the MainStreetXpress 36170 Multiservices Switch or 670 RSP, both manufactured by Newbridge Networks Corporation; the GX 550 Smart Core ATM Switch, manufactured by Lucent Technologies Inc.; and the Passport 15000 Multiservice Switch, manufactured by Nortel Networks Corporation. In an embodiment, common equipment in an ATM switch, such as the switching fabric, the control processor, the power supply, wiring, fuses, alarms, etc. are redundant. Consequently, failure of one such unit has no impact on the operation or the performance of the ATM switch.

Redundant interface cards, however, are not provided. Thus, when an unprotected interface card or port fails, calls being carried by that interface card or port are dropped. The ATM switches connected via the failed interface card or port will then flag the associated card or port as unavailable, and future calls will automatically avoid using the failed card or port until it is repaired. After the card or port is repaired, minimal manual intervention will be required in order for traffic to resume using that card or port, as is well known.

In the exemplary ATM network, redundant ATM switches are not provided. In other words, an ATM switch does not have a standby. Thus, in the event of a total ATM switch failure, such as loss of the building, calls being carried by the ATM switch are dropped. The ATM network will then flag the failed switch as unavailable, and future calls will automatically avoid this switch until it is repaired. After the ATM switch is repaired, minimal manual intervention will be required in order for traffic to resume using that ATM switch, as is well known.

SMS

Figure 5:
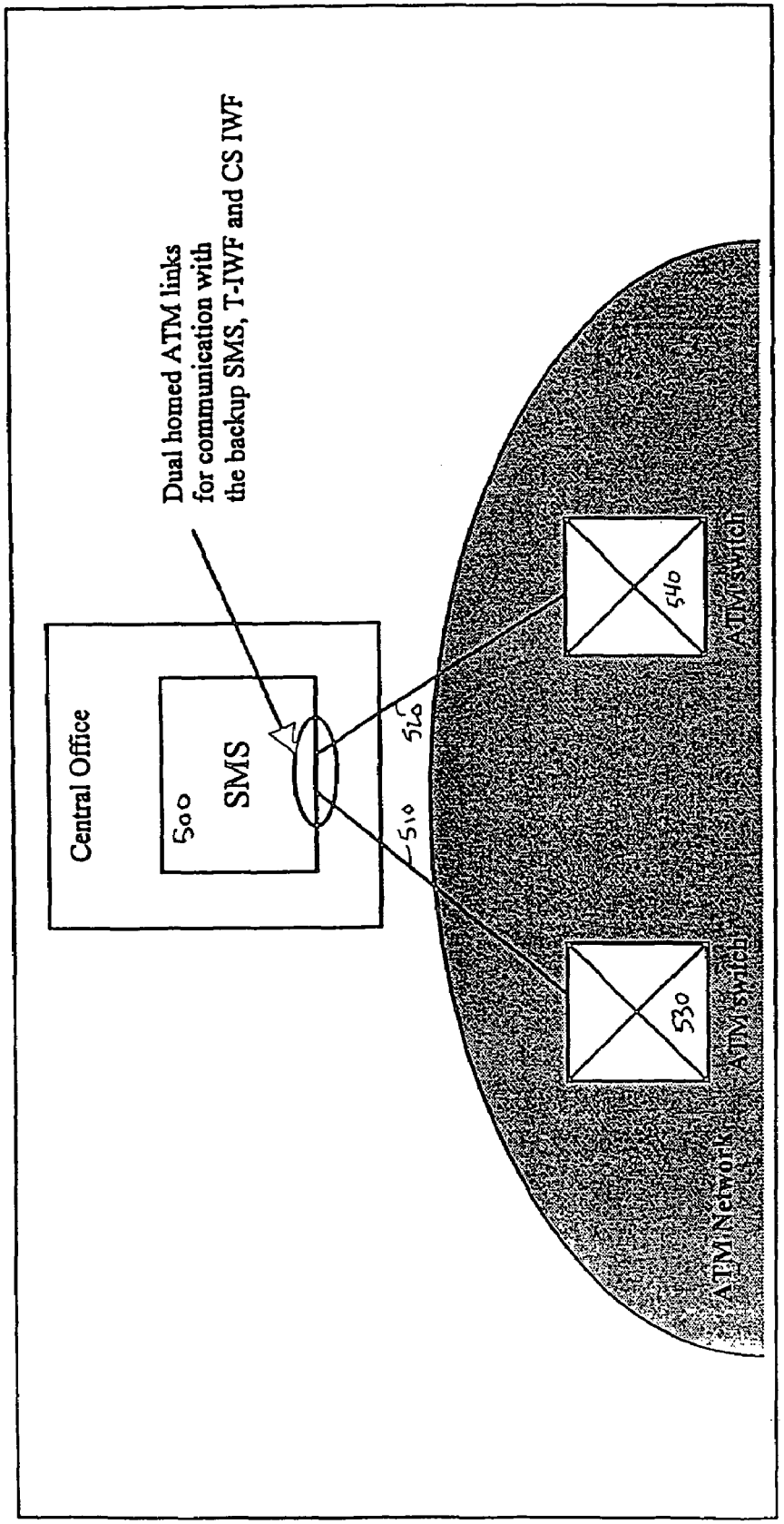
FIG. 5 shows an SMS connected to an ATM network, according to a further aspect of the present invention.

FIG. 5 shows a single switch management system (SMS) unit 500. The SMS is the element layer manager of the ATM-based virtual tandem. It communicates with the T-IWFs and the CS-IWF, and the legacy operation support systems (OSS). Essentially, it controls management of the distributed switch and acts as a man-machine interface enabling a human user to view and control the overall behavior of the VTOA. According to one embodiment, it communicates with other network management systems involved in the virtual tandem, such as the operation support system of the ATM network. The SMS can be located either in a central office or in a data center, and should be NEBS level 3 compliant. Exemplary SMSs include the OneLink Manager, from Lucent Technologies Inc., and the Succession Network Manager, from Nortel Networks Corporation.

According to an embodiment, the SMS includes a primary SMS unit 500 and a backup SMS unit (not shown) that takes over if the primary SMS unit 500 fails. That is, the primary and the backup SMS units operate in an active/standby mode. The backup SMS unit may support multiple primary SMS units 500, as dictated by engineering and operational network requirements, and must be located in a different building from the building housing the primary SMS unit 500.

As seen in FIG. 5, each SMS unit 500 maintains dual ATM links 510, 520 with two different ATM switches 530, 540, preferably on separate SONET rings. The dual links 510, 520 allow control communications with the backup SMS unit, the T-IWFs, and the CS-IWF. In other words, each switch management system unit has management connectivity to other VTOA system elements provided by paths through the ATM network.

Each SMS unit must provide application redundancy within itself, with automatic, transparent switch over in the event of failure of the active SMS application. Redundancy may be accomplished by providing a backup processor in each physical platform and/or providing backup software applications. For example, two applications may run side by side in a single processor, or separately in two processors, or the second application may begin in the second processor when the first application fails. Consequently, if part of one physical platform fails, the remaining portion of the physical platform is configured so that it can compensate for the failed portion.

In the event of failure of the active SMS unit 500, the switch of its load to the other unit must be accomplished with minimal manual actions, ideally no actions and preferably no more than a system administrator approaching the physical platform and issuing necessary instructions to the SMS through a computer terminal. Failure of the active unit must have minimal impact on an operations user of an SMS graphical user interface (GUI). For example, the operations user should not have to re-boot the computer or re-log in to the computer to continue using the GUI. Slower processing of commands is acceptable, and alarms and/or notifications of the switchover are necessary.

If the active SMS unit 500 fails, the SMS as a system restores its operation in the following sequence:
1. Essential surveillance such as status and critical alarms;
2. Billing functions;
3. Full surveillance capability;
4. Configuration management;
5. Performance management.

Essential surveillance refers to capabilities such as determining whether the VTOA switch is functional or non-functional, and determining the overall health of individual components of the network. Billing is self explanatory. Full surveillance refers to capabilities such as viewing all state changes within the system, viewing alarms and events, e.g., a card within a component that failed, etc. Configuration management refers to capabilities such as rearranging equipment and adding new connections. Performance management refers to capabilities such as collecting data for such tasks as engineering or growth of the network.

Each SMS unit has its own continually updated database. Each database is synchronized with the other VTOA databases. The database enables the five functions discussed above and includes such information as the system users, networking software, the network inventory, security, etc. Awareness of the network topology is also provided by the database.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. It should also be noted that the software implementations of the present invention can be stored on a tangible storage medium such as a magnetic or optical disk, read-only memory or random access memory and be produced as an article of manufacture.

What is claimed is:

1. An end office building for interaction with a virtual trunking system including a packet switched data network comprising a plurality of data network switches, and at least one control and signaling interworking function complex, the end office building comprising:
   a plurality of T-IWFs, each T-IWF converting voice to a format compatible with the data network and converting from the data network format to voice, each T-IWF being capable of dynamically establishing end-to-end connections to another T-IWF device, each T-IWF having a plurality of processors with at least one processor being configured to compensate for a failed processor, at least one T-IWF being configured to absorb at least a portion of a failed T-IWFs workload; and
   a central office switch that distributes calls among the plurality of T-IWFs in a load sharing manner,
   wherein the at least one processor that compensates for the failed processor is configured to cooperate with the at least one T-IWF absorbing at least a portion of the failed T-IWFs workload, enabling the end office building to survive a simplex failure.

2. The end office building of claim 1, further comprising at least one add/drop multiplexor (ADM) that connects the plurality of T-IWFs to the data network.

3. The end office building of claim 2, wherein each T-IWF further comprises an optical interface for connecting to the ADM, the optical interface supporting SONET 1+1 automatic protection switching.

4. The end office building of claim 1, in which at least one T-IWF connects to a first data network switch that is different from a second data network switch to which another T-IWF connects, wherein each end office building connects to a plurality of data network switches so that if one data network switch fails, the end office building remains connected to the data network.

5. The end office building of claim 1, wherein the at least one control and signaling interworking function complex comprises a plurality of control and signaling interworking function units connected to the data network, each unit having a plurality of processors, the complex performing call control functions for transmitting voice across the data network and interfacing narrowband signaling and broadband signaling for call processing and control within the data network, so that calls originating or terminating within a public switched telephone network are transmitted through the data network.

6. A virtual trunking system communicating with a plurality of mated signaling transfer points, the virtual trunking system comprising:
   a data network comprising a plurality of interconnected data network switches;
   at least one CS-IWF complex comprising a plurality of CS-IWF units connected to at least one of the data network switches and connected to at least one of the signaling transfer points, each unit having a plurality of processors, the complex performing call control functions for transmitting voice across the data network and interfacing narrowband signaling and broadband signaling for call processing and control within the data network so that telephone calls originating and/or terminating within a public switched telephone network are transmitted through the data network;
   at least one end office building comprising a plurality of T-IWFs, each T-IWF having a plurality of processors and each T-IWF being capable of dynamically establishing an end-to-end connection to another T-IWF device, and a central office switch that distributes calls among the plurality of T-IWFs in a load sharing manner; and
   a switch manager comprising a plurality of switch manager units, at least one of the switch manager units comprising a backup unit for at least one primary switch manager unit, each switch manager unit being configured to provide application redundancy within itself,
   wherein the virtual trunking system is configured to survive a simplex failure.

7. The system of claim 6, in which the data network further comprises at least two completely disjointed routes between any two end points.

8. The virtual trunking system complex of claim 6, the at least one CS-IWF complex further comprising a plurality of signaling link sets, each link set connecting the CS-IWF complex to one of the mated signaling transfer points.

9. The virtual trunking system of claim 8, the at least one CS-IWF complex further comprising a plurality of signaling gateways that connect to each of the plurality of CS-IWF units, each signaling gateway connecting to one of the mated signaling transfer points, the plurality of signaling gateways reducing isolation of the CS-IWF units when a link failure occurs.

10. The virtual trunking system of claim 6, in which the plurality of processors of each CS-IWF unit operate in an active/standby mode.

11. The virtual trunking system claim 6, in which the plurality of processors of each CS-IWF unit operate in a load sharing mode.

12. The virtual trunking system of claim 6, further comprising a single point code identifying the CS-IWF complex.

13. The virtual trunking system of claim 6, wherein each of the plurality of T-IWFs connect to the data network by at least one add/drop multiplexor (ADM).

14. The virtual trunking system of claim 13, wherein each T-IWF further comprises an optical interface for connecting to the at least one ADM, the optical interface supporting SONET 1+1 automatic protection switching.

* * * * *

UNITED STATES PATENT AND TRADEMARK OFFICE
CERTIFICATE OF CORRECTION

| | | |
|---|---|---|
| PATENT NO. | : 7,227,837 B1 | Page 1 of 1 |
| APPLICATION NO. | : 09/534308 | |
| DATED | : May 23, 2000 | |
| INVENTOR(S) | : Bi et al. | |

It is certified that error appears in the above-identified patent and that said Letters Patent is hereby corrected as shown below:

On the cover page, item (75), 12th Inventors, "Raleigh" should be --Morrisville--.

Signed and Sealed this

Thirteenth Day of May, 2008

JON W. DUDAS
*Director of the United States Patent and Trademark Office*

UNITED STATES PATENT AND TRADEMARK OFFICE
CERTIFICATE OF CORRECTION

PATENT NO.         : 7,227,837 B1  
APPLICATION NO.    : 09/534308  
DATED              : June 5, 2007  
INVENTOR(S)        : Bi et al.

Page 1 of 1

It is certified that error appears in the above-identified patent and that said Letters Patent is hereby corrected as shown below:

On the cover page, item (75), 12th Inventors, "Raleigh" should be --Morrisville--.

This certificate supersedes the Certificate of Correction issued May 13, 2008.

Signed and Sealed this

Third Day of June, 2008

JON W. DUDAS  
*Director of the United States Patent and Trademark Office*